Nov. 5, 1968 R. ROLFE 3,408,987
GRAIN SOAKER AND LIQUID NUTRIENT DISPENSING DEVICE
Filed April 13, 1966 2 Sheets-Sheet 1

INVENTOR.
Robert Rolfe

Nov. 5, 1968 R. ROLFE 3,408,987
GRAIN SOAKER AND LIQUID NUTRIENT DISPENSING DEVICE
Filed April 13, 1966 2 Sheets-Sheet 2

INVENTOR.
Robert Rolfe

United States Patent Office 3,408,987
Patented Nov. 5, 1968

3,408,987
GRAIN SOAKER AND LIQUID NUTRIENT
DISPENSING DEVICE
Robert Rolfe, Fayette County, Ohio
Filed Apr. 13, 1966, Ser. No. 544,347
6 Claims. (Cl. 119—51)

ABSTRACT OF THE DISCLOSURE

A tiltable hopper mounted on a two-wheel trailer frame is disclosed for use in transporting, soaking, and discharging grain for feeding livestock. The hopper is provided with an outlet to which a pump, powered by a tractor power take off, and hoses are connected for removing water from the hopper. The hopper is tiltable for pouring out the grain by operation of a hydraulic piston and cylinder system connectible to a tractor hydraulic system. Grain is soaked in the hopper, the water and its nutrients are separated from the soaked grain, and each is separately fed to the livestock.

---

This invention is a apparatus that will be a benefit to livestock feeders and especially to those that feed hogs. It is portable, therefore making it possible to transport feed any place desired.

The object of this invention is to provide a means to soak ear corn, which will eliminate all processing of the ear corn from the corn crib to the livestock, except the process of soaking the corn.

Another object of this invention is to provide a means whereby the water used to soak the ear corn can be saved to add to the drinking water of hogs.

A further object of this invention is to decrease the cost of hog production.

Additional objects and advantages of this invention will become evident from a study of the following description taken in conjunction with the accompanying drawing, in which.

Figure 1:
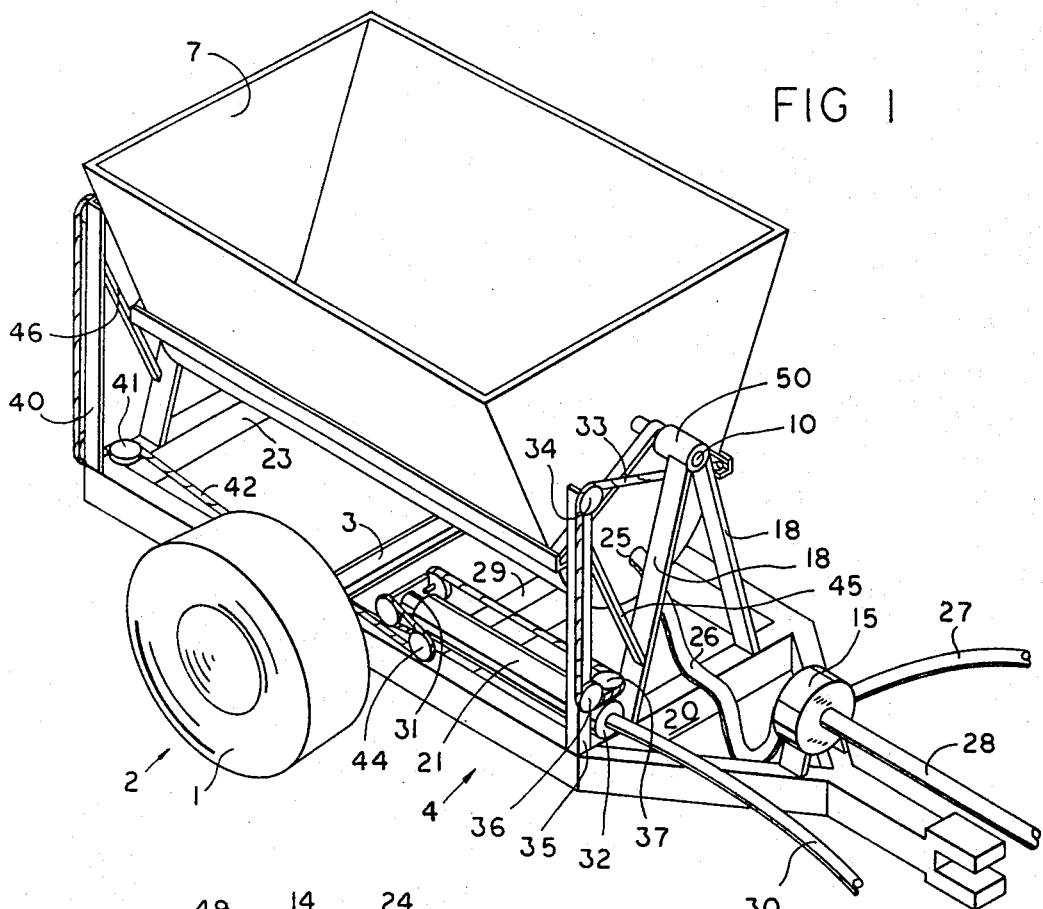
FIGURE 1 is a perspective view of the open top hopper, front end, and right side of grain soaker.

The grain soaker includes a water tight hopper 5, which is open at the top, a metal frame 4, for the mounting of the hopper 5, an axle 3 with rubber tires 1 and metal wheels 2, a centrifugal water pump 15, power take off shaft 28, and a hydraulic cylinder 21.

In FIGURE 1 the tires 1, the wheels 2, and the axle 3 must be strong enough to carry and support 5,000 pounds.

In FIGURE 1 the metal frame 4 is mounted on axle 3 so that axle 3 is two inches from the center of frame 4 to the rear. The metal frame 4 is constructed of channel iron, welded together, strong enough to carry and support 5,000 pounds.

Figure 3:
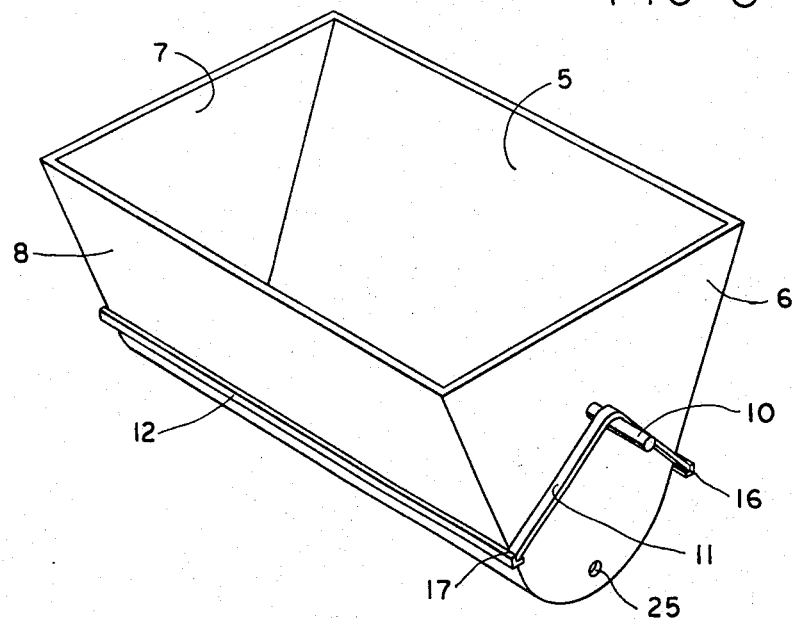
FIGURE 3 is a front end and right side perspective view of the hopper of the grain soaker.
Figure 4:
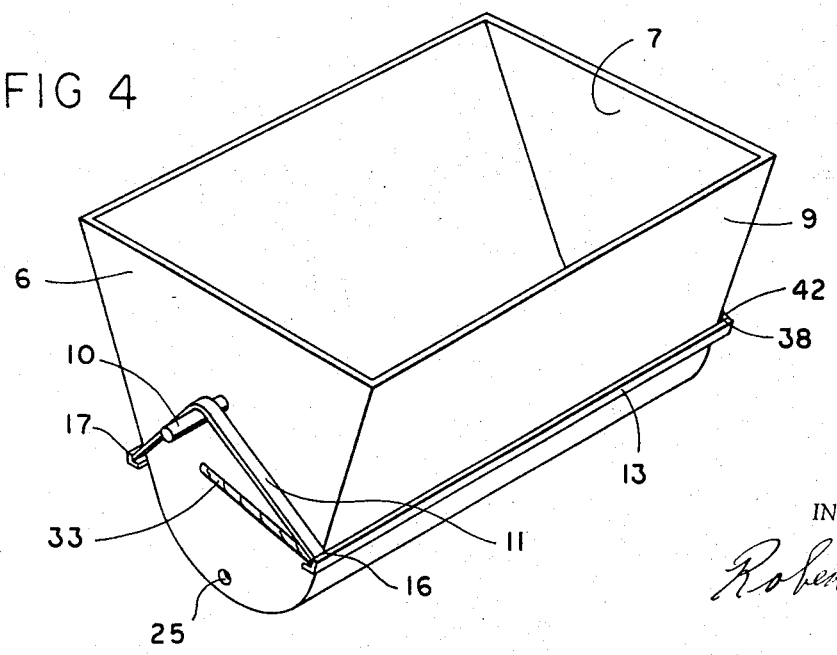
FIGURE 4 is a front end and left side perspective view of the hopper of the grain soaker.

In FIGURE 3 the hopper 5 may be made of a sheet metal such as 8 gauge steel or any other suitable metal, being put together by welding or any other means so that it is water tight. In FIGURE 3 the hopper 5 includes front end 6, rear end 7, and right side 8, and in FIGURE 4 the left side 9. Beginning at the top edge of hopper 5 the sheet metal for the sides is shaped to form a round bottom on hopper 5. Approximate size of hopper 5 as shown in FIGURE 3 is six feet long, five feet wide, and five and one half feet deep. In FIGURE 3 a piece of metal tubing twelve inches long and four inches in diameter is welded to hopper 5 on front end 6 in the center from side to side and two feet from the top of hopper 5 making a shaft 10. A strap iron 11 is formed or bent around shaft 10, placed six inches from end of shaft 10 and welded, and extending to the end of angle iron 12 in FIGURE 3 and to the end of angle iron 13 in FIGURE 4, with ends of strap iron 11 placed close to hopper 5 and welded at points 16 and 17. The strap iron 11 is support for shaft 10. The same procedure as performed on the front end 6 of hopper 5 to make the shaft 10 is used to make the shaft 14 on the rear end 7 of hopper 5. In FIGURE 3 a angle iron 12 is welded to the right side of hopper 5 extending one and one half inches past each end of hopper 5. In FIGURE 4 a angle iron 13 is welded to the left side of hopper 5 extending three inches past each end of hopper 5.

In FIGURE 1 the ends of two channel irons 18 are welded to the cross member 20 of metal frame 4 and brought together at the top and welded to one half of a piece of metal tubing four inches long. The other half of tubing is bolted on to form the bearing 50 for shaft 10. This procedure makes a support and pivot for the front end 6 of the hopper 5.

Figure 2:
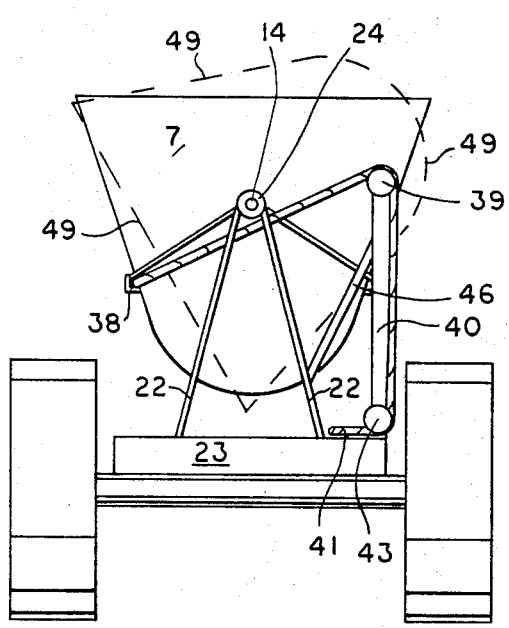
FIGURE 2 is a rear view of grain soaker shown in FIGURE 1.

In FIGURE 2 the ends of two channel irons 22 are welded to the cross member 23 of metal frame 4 and brought together at the top and welded to one half of a piece of metal tubing four inches long. The other half of tubing is bolted on to form the bearing 24 for shaft 14. This procedure makes a support and pivot for rear end 7 of the hopper 5.

FIG. 1 a centrifugal water pump 15 is mounted on front end of metal frame 4 to remove the water from grain in hopper 5 to a water tank or fountain used to water hogs. Water pump 15 is connected to hopper 5 at an outlet 25 by a flexible hose 26. Grain is kept from entering outlet 25 by a strainer over outlet 25. Water from pump 15 is directed in water tank or fountain by a flexible hose 27. Water pump 15 is operated by a power take off shaft 28 connected to a power takeoff shaft of a tractor. After water is pumped from hopper 5 the grain or ear corn is dumped for feeding by the tilting of the hopper 5 to the position as shown by the dotted line 49 in FIGURE 2.

In FIGURE 1 the tilting is accomplished by a hydraulic cylinder 21, with a piston movement of thirty three inches, with the base end 32 of cylinder 21 mounted on front cross member 20 of metal frame 4 and the piston end 31 of cylinder 21 mounted on cross member 29 of metal frame 4. Hydraulic cylinder 21 is connected to the hydraulic system of a tractor by a flexible hose 30. Cylinder 21 is equipped with two pulleys on piston end 31 and two pulleys on base end 32. This allows hopper 5 to move twice as far as cylinder piston moves.

In FIGURE 4 an end of steel cable 33 is fastened on angle iron 13 at point 16 and in FIGURE 1 strung to a pulley 34 at top end of vertical channel iron 35, to a pulley 36 at base of channel iron 35, to a pulley 37 on cross member 20 of metal frame 4, to a pulley on piston end 31 of cylinder 21, to a pulley on base end 32 of cylinder 21, and fastened at piston end 31 of cylinder 21. In FIGURE 4 a steel cable 42 is fastened to angle iron 13 at point 38 and in FIGURE 2 strung to a pulley 39 at top of vertical channel iron 40, to a pulley 43 at base of vertical channel iron 40, and in FIGURE 1 to a pulley 41 on cross member 23 of metal frame 4, to a pulley 44 on cross member 29 of metal frame 4, to a pulley on piston end 31 of cylinder 21, to a pulley on base end 32 of cylinder 21, and fastened at piston end 31 of cylinder 21.

A channel iron 45 is welded to upper part of vertical channel iron 35 and to lower part of the support leg 18 to brace the vertical channel iron 35 in FIGURE 1.

A channel iron 46 is welded to the upper part of vertical channel iron 40 and to lower part of the support leg 22 to brace the vertical channel iron 40 in FIGURE 2.

In operating my device, the hopper 5 is filled with grain. For example, my soaker may be positioned near a granary to discharge grain directly from the granary through a chute into the hopper. Water is mixed with the grain in the hopper and the mixture may be pulled to the feed lot.

After sufficient soaking, the pump 15, connected to the tractor's power take off, is operated to discharge the water, with some nutritional material in it, into a watering trough thereby making it available to the livestock.

After the water is separated from the soaked grain, the soaker is positioned next to a feed trough. The hydraulic cylinder 21 is actuated to tilt the hopper and dump the soaked grain into the feed trough.

It can be seen that my soaker will function equally well with ear corn and therefore I have eliminated the need to shell corn which is to be soaked.

The foregoing is an illustration only of the principles of the invention. Further, since numerous modifications and changes will or can occur to those skilled in the art, it is not desired to limit the invention to exact construction as shown or described.

What is now claimed as new and to be protected by Letters Patent of the United States is:

1. A grain soaker for receiving, soaking, transporting and discharging grain and the soaking liquids associated therewith for animal consumption, the soaker comprising:
   (a) a frame;
   (b) a watertight hopper mounted on the frame for receiving the grain and the liquids for soaking the grain;
   (c) means communicating with the hopper for discharging liquid from the hopper without discharging grain from the hopper;
   (d) means for discharging the grain from the hopper to present it to animals; and
   (e) wheels mounted to the frame for transporting the soaker.

2. A grain soaker according to claim 1, wherein said liquid discharging means comprises a valve and outlet having a screen at the input of the valve.

3. A grain soaker according to claim 1, wherein said liquid discharging means comprises a pump and hoses connected to an opening in said hopper.

4. A grain soaker according to claim 1, wherein said grain discharging means comprises means for substantially tilting the hopper whereby the grain may be poured out of the hopper.

5. A grain soaker according to claim 4, wherein said tilting means comprises a hydraulic piston and cylinder mechanically connected to the hopper.

6. A grain soaker according to claim 4, wherein said hopper is narrower at its bottom than at its top to facilitate removal of the grain from the hopper.

References Cited

UNITED STATES PATENTS

| | | | |
|---|---|---|---|
| 571,280 | 11/1896 | Nason | 119—53 |
| 1,138,950 | 5/1915 | Henderson | 119—52.2 |
| 2,530,597 | 11/1950 | Chandler | 119—51.5 |
| 2,807,234 | 9/1957 | Middlen | 119—51 |
| 3,196,835 | 7/1965 | Bergevin | 119—51.11 |
| 3,233,590 | 2/1966 | Venca | 119—51.5 |
| 3,292,584 | 12/1966 | Brodrick | 119—51 |
| 3,295,500 | 1/1967 | Blough | 119—51.5 |
| 3,339,529 | 9/1967 | Holste et al. | 119—51.5 |

ALDRICH F. MEDBERY, *Primary Examiner.*